United States Patent [19]
Ohmiya et al.

[11] 3,941,391
[45] Mar. 2, 1976

[54] RECORD DISK LOADING SYSTEM

[75] Inventors: Shoji Ohmiya, Shijonawate; Toshio Yoshimatsu, Neyagawa, both of Japan

[73] Assignee: Matsushita Electric Industrial Co., Ltd., Osaka, Japan

[22] Filed: Oct. 29, 1974

[21] Appl. No.: 518,881

[52] U.S. Cl. .......................... 274/9 B; 179/100.1 DR
[51] Int. Cl.² ........................................ G11B 25/04
[58] Field of Search .................. 274/1 R, 9 B, 42 R; 360/99; 179/100.1 DR

[56] References Cited
UNITED STATES PATENTS

| | | | |
|---|---|---|---|
| 2,555,594 | 6/1951 | Markovitz | 274/42 R |
| 3,823,948 | 7/1974 | Jenkins | 274/9 B |
| 3,836,731 | 9/1974 | Wilisch | 360/99 |

Primary Examiner—Richard E. Aegerter
Assistant Examiner—A. J. Mirabito
Attorney, Agent, or Firm—Stevens, Davis, Miller & Mosher

[57] ABSTRACT

A recording-reproducing system comprising a flexible jacket containing a record disk, a turn table rotating said record disk, an engaging means engaged to one end of said record disk in said jacket, a stopping means for restricting only the movement of said record disk, and a thrust means for transferring said jacket, whereby said record disk can be taken out of said jacket within the reproducing system.

4 Claims, 6 Drawing Figures

RECORD DISK LOADING SYSTEM

This invention relates to a recording-reproducing system using a disk-like recording medium, wherein the recording medium in a state of being contained in a jacket is inserted in the system and then taken out of the jacket automatically to be loaded on a turn table.

In the conventional reproducing system using a record disk, it has been necessary at the time of reproducing the record disk to take the record disk out of a jacket which protects it. In one method, loading of the record disk into the reproducing system is done after the disk is taken out of the jacket. In another method, loading of it into the reproducing system is done under the condition that the disk is contained within a jacket. In the former method, due to manual loading, there is a possibility of touching the recording surface and thereby damaging it. So, the disk should be handled very carefully, which is rather troublesome, although in this respect, the latter method is favorable, the jacket or the protecting case should be made large, accordingly as the diameter of record disk increases. Therefore, the size of the reproducing system should be made larger than the total size of the record disk and the jacket. For a disk with a particularly large diameter, the reproducing system becomes impractically large. With use of a flexible record disk which could be bent the reproducing system may be smaller, but it is not applicable to a disk made of hard material.

According to this invention, it is intended, regardless of a hard or a flexible disk, to remove such a defect where the size of the reproducing system should be more than twice that of the record disk, thereby enabling the removal of the disk from the jacket within the reproducing system.

Furthermore, the record disk loading system according to this invention the following effects:

1. Since the record disk in a state of being contained in the jacket is loaded in the reproducing system, the disk is free from being touched by hand. There is no possibility of it becoming dirty.
2. That the record disk is kept contained in a jacket makes handling easy.
3. By accommodating the jacket in the state of being bent after removal of the record disk therefrom, the size of the system can be made small.
4. Since the jacket together with the record disk is loaded in a flat state and the jacket alone is then bent, any record disk, either of soft or hard material, may be used.
5. Since it is only within the reproducing system that the record disk is taken out of the jacket, there is substantially no possibility that the surface of the disk is exposed to dirt, etc.

Embodiments of this invention will be explained hereinafter taken in conjunction with the drawings, in which.

Figure 1:
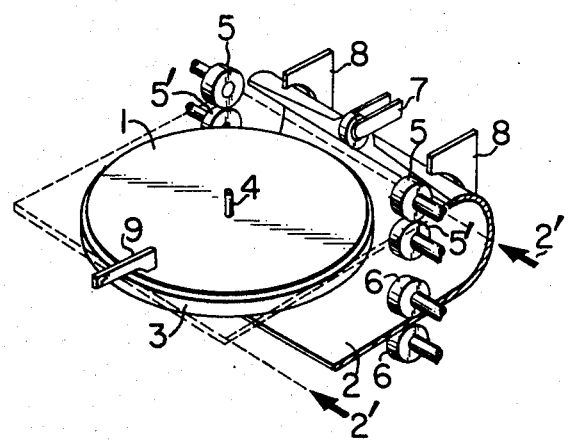
FIG. 1 is a perspective view of the main part of one embodiment of this invention.

FIG. 1 shows the internal structure of one embodiment of this invention. Numeral 1 designates a record disk which has been loaded, and 2 designates a flexible jacket which, after having the disk removed, is bent and transferred to be accommodated. 2' indicates the direction into which the flexible jacket is initially loaded in the reproducing system. 3 designates a turn table, on which the record disk is placed and rotated. 4 designates a center guide pin which adjusts the rotation center of record disk 1 to that of the turn table 3. 5 and 6 are rollers which drive the flexible jacket. 7 is a roller which expands the opening of the jacket 2 to make it easy for the record disk to be accommodated in it and serves also as a guide for transferring the jacket. 8 designates a guide member which, in this embodiment, acts to bend the flexible jacket 2 in order to thrust it under the turn table 3. 9 is meant for stopping the movement of record disk 1, i.e. this stopping member 9 holding the disk. The rollers 5 and 6 begin to drive the jacket 2.

Figure 2:
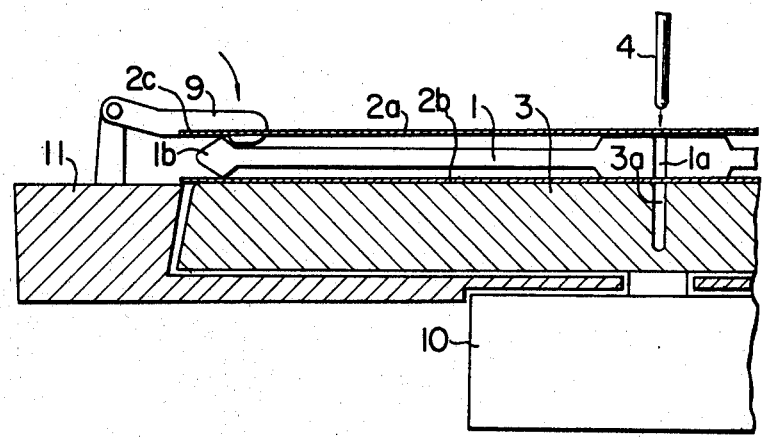
FIG. 2 is a cross sectional view of the main part of the above embodiment.
Figure 3:
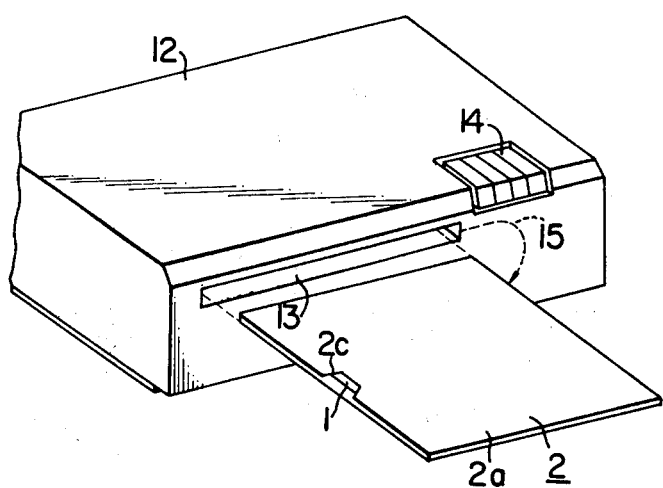
FIG. 3 is a perspective view showing the external appearance of the embodiment of this invention.

FIG. 2 is a view of the flexible jacket 2 seen from the direction of insertion. 10 designates a motor which rotates the turn table, and 11 is a chassis. 1a designates a center hole of the record disk 1, which is adjusted to the center hole 3a of the turn table 3 and guided by a center guide pin 4. In this embodiment, the periphery of the record disk is made thicker than the inner part. The stopping member 9 touches this thick peripheral portion to fix the record disk. 2a and 2b designate upper and lower surfaces of the flexible jacket 2. In this embodiment, it is assumed that only one surface of record disk 1 is reproduced. Therefore, as shown in FIG. 3, a cut 2c is provided only in the surface 2a at a possition related to the stopping member 9. When both surfaces of record disk 1 are to be reproduced, it is necessary to provide cuts on both surfaces.

Next, explanation will be made of the manner in which this embodiment works. When the flexible jacket containing the record disk 1 is loaded on the turn table 3, the stopping member 9 and the center guide pin 4 are in a position sufficiently above the top surface of the turn table 3. The jacket is loaded without being restricted by the turn table 3, the center guide pin 4 and the damping member 9. The rollers 5 and 5' are in separated state, between which the ends of jacket 2 are placed. Next, when the flexible jacket 2 is loaded, the stopping member is lowered and catches the thick peripheral portion 1b of record disk 1 through the cut 2c (see FIG. 2). Then, either of the rollers 5 or 5' is moved in a direction pressing each other and driven in rotation, so that only the flexible jacket is bent and guided by them under the turn table 3. Finally, the rollers 6 transfer the jacket to its end position. When the transfer is completed, the center guide pin 4 drops down to adjust and guide the centers of record disk 1 and turn table 3. Also, the stopping member 9 rises and is in a position sufficiently separated from the record disk 1. The preparatory stage of reproduction is thus finished. Although not shown in the figures, the contents of the record are reproduced by a transducer element, etc.

When the record disk is to be taken out, the rollers 6 are made to rotate in a reverse direction such that the jacket 2 envelopes the record disk 1. The opening part of the flexible jacket 2, being engaged with the roller 7, expands largely by its elasticity, and thus makes it easy for the record disk to be contained in the jacket 2. At this step, the center guide pin 4 rises upwards. After complete accommodation the flexible jacket may be taken out manually.

FIG. 3 is a view showing the external appearance of the embodiment, where 12 designates the main body, 13 the opening for inserting the flexible jacket, 14 the operation buttons, and 15 indicates the direction of entering the jacket into the reproducing system according to the present method.

Figure 4:
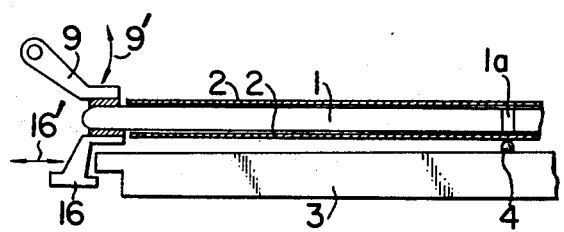
FIG. 4 is a cross sectional view of the main part of another embodiment of this invention.

FIG. 4 shows another embodiment, where the peripheral portion of record disk 1 is not thick. What distinguishes this embodiment from the foregoing one is that both surfaces of the flexible jacket have cuts at which a stopping member 9 and another stopping member 16, opposite thereto, are provided. The directions of their movements are indicated by arrow 9' and 16' respectively. It is intended that the record disk 7 is held between the members. As different from the case of FIGS. 1 and 2, the center pin 4 ejects downwards.

Figure 5:
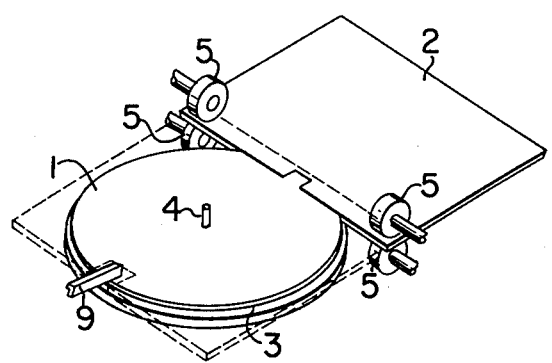
FIG. 5 is a perspective view of the main part of the above embodiment.

While in the above embodiments the jacket is flexible, FIG. 5 shows a case where it is transferred without being bent.

Figure 6:
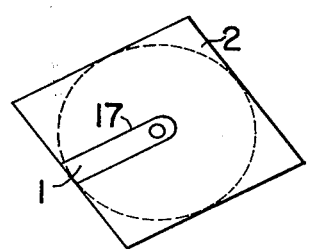
FIG. 6 is a perspective view of a jacket used in a further embodiment of this invention.

In all of the foregoing embodiments, adjustment between the center pin and the record disk is done after the movement of the jacket. Since this makes the structure rather complicated, in FIG. 6 an opening extending from the edge of jacket 2 to the central portion thereof is provided. The center hole of record disk 1 is engaged with the center pin, which thus serves as the stopping member in the foregoing cases. In order to avoid dirt during storage and secure stable transportation, such a double structure may be constructed such that the jacket of FIG. 6 constitutes an inner jacket, whereby only when the jacket is situated in the system the inner jacket is exposed.

Although in the above embodiments the flexible jacket is transferred in a sideward direction and bent, it may be transferred in rearward direction. The downward bending may be replaced by an upward one. The center guide pin, instead of an upwards direction, may return into the turn table. Furthermore, the way of making an opening in the jacket is not limited to that described.

As mentioned above, this invention provide a method for loading the record disk in a state of being contained in a jacket into a reproducing system. Therefore, the disk protected by the jacket is free from the fear of being scratched, etc. Furthermore, since the jacket is bent after the record disk is taken out, the size of the reproducing system, which usually should be more than twice the diameter of record disk, may be smaller than this value.

What is claimed is:

1. A system for loading a record disk contained within a flexible jacket into a recording and reproducing apparatus including a turn table for rotating said disk, said system comprising stopping means secured to said apparatus adjacent said turn table, said stopping means engaging said record disk and restricting only the movement of said record disk contained within said flexible jacket when said disk and flexible jacket are loaded on said turn table, and thrust means secured to said apparatus adjacent said turn table for transferring said flexible jacket to an interim position under said turn table, said jacket being bent in said interim position and while being transferred thereto.

2. A system according to claim 1, in which said stopping means for stopping said record disk engages with a protrusion provided in the periphery of said record disk.

3. A system according to claim 1 in which said stopping means holds the peripheral portion of said record disk, both sides of said peripheral portion being exposed by cut portions of said jacket.

4. A system according to claim 1 wherein said turn table is provided with a center pin and wherein said center pin comprises said stopping means.

* * * * *